United States Patent [19]
Terrell et al.

[11] Patent Number: 5,579,529
[45] Date of Patent: Nov. 26, 1996

[54] METHOD FOR CONFIGURING COMPUTER PERIPHERALS

[75] Inventors: Michael R. Terrell; Jeffery W. Kaisner; Jonathan D. Amsden, all of Easley; Thomas C. Burke, Liberty; David K. Todd, Greenville, all of S.C.

[73] Assignee: NCR Corporation, Dayton, Ohio

[21] Appl. No.: 424,227

[22] Filed: Apr. 19, 1995

Related U.S. Application Data

[63] Continuation of Ser. No. 176,022, Dec. 30, 1993, abandoned.

[51] Int. Cl.$^6$ .............................. G06F 13/00; G06F 13/10
[52] U.S. Cl. ................ 395/828; 395/800; 364/DIG. 1; 364/DIG. 2
[58] Field of Search .................... 395/800, 828; 364/DIG. 1, DIG. 2

[56] References Cited

U.S. PATENT DOCUMENTS

| | | | |
|---|---|---|---|
| 4,245,308 | 1/1981 | Hirschman et al. | 364/200 |
| 4,456,972 | 6/1984 | Lee et al. | 364/900 |
| 5,111,423 | 5/1992 | Kopec, Jr. et al. | 395/500 |
| 5,197,128 | 3/1993 | Campbell et al. | 395/275 |
| 5,237,689 | 8/1993 | Behnke | 395/700 |
| 5,239,621 | 8/1993 | Brown, III et al. | 395/115 |
| 5,317,693 | 5/1994 | Cuenod et al. | 395/275 |
| 5,339,432 | 8/1994 | Crick | 395/700 |
| 5,348,407 | 9/1994 | Hock et al. | 400/711 |
| 5,371,837 | 12/1994 | Kimber et al. | 395/114 |
| 5,428,748 | 6/1995 | Davidson et al. | 395/275 |
| 5,461,704 | 10/1995 | Wakabayashi et al. | 395/114 |

FOREIGN PATENT DOCUMENTS

| | | |
|---|---|---|
| 0048781 | 4/1982 | European Pat. Off. . |
| 0192066 | 8/1986 | European Pat. Off. . |

OTHER PUBLICATIONS

IBM Personal System/2 Model 80 Technical Reference, pp. 2–51 to 2–63.

*Primary Examiner*—Tod R. Swann
*Assistant Examiner*—Valerie Darbe
*Attorney, Agent, or Firm*—George H. Gates

[57] ABSTRACT

A method for the configuration of peripheral adapters in computer systems. The method examines a flag in a Configuration Space of the peripheral adapter to determine if user-selectable configuration options are required for the peripheral adapter. If the flag is set, then a configuration file is retrieved and interpreted to determine how the peripheral adapter should be configured and to determine how the configuration options should be presented to the user. Such configurations options may be conditional and based on previous user selections. Once the user's selections have been made, the method updates registers in the peripheral adapter with the selected option values.

18 Claims, 9 Drawing Sheets

5,579,529

METHOD FOR CONFIGURING COMPUTER PERIPHERALS

This is a continuation of application Ser. No. 08/176,022, filed Dec. 30, 1993, now abandoned.

BACKGROUND OF THE INVENTION

1. Field of the Invention

This invention relates in general to methods for configuring computer systems, and in particular to a method for conveying device-specific, user-selectable configuration options for peripheral devices.

2. Description of Related Art

The *PCI Local Bus Specification, Production Version, Revision* 2.0, dated Apr. 30, 1993, and incorporated by reference herein, defines the standard mechanism to support the connection of peripheral devices to a PCI local bus. The PCI Specification also addresses how peripheral devices can define system resource requirements and communicate those requirements to the computer. It is recognized that some devices will require user selection of configuration options. The PCI Specification does not, however, address how a peripheral device conveys device-specific configuration options to a system utility such that they can be presented to a user for selection and to the computer for configuring the peripheral device. Without a standard mechanism for configuring peripheral devices, each vendor would provide their own unique configuration mechanism. For PCI systems that already support a system configuration utility, for example, where the PCI system includes a MicroChannel™ (MCA) or EISA bus and uses the MCA or EISA configuration utilities, it would be unacceptable to require users to use multiple configuration utilities, i.e., one for each of the peripheral devices. Moreover, vendors would be forced to deal with the development and management headaches associated with multiple configuration utilities for multiple operating environments.

SUMMARY OF THE INVENTION

To overcome the limitations in the prior art described above, and to overcome other limitations that will become apparent upon reading and understanding the present specification, the present invention discloses a method for the configuration of peripheral devices. The method examines a flag in the peripheral device to determine if user-selectable configuration options are required for the peripheral device. If the flag is set, then a configuration file is retrieved. The configuration file may reside within a Read Only Memory (ROM) in the peripheral device. The configuration file is interpreted to determine how the peripheral device should be configured and to determine how the configuration options should be presented to the user. Such configurations options may be conditional and based on previous user selections. Multiple language formats are supported within a single configuration file to eliminate the need to maintain separate files. The syntax specification of the configuration file includes a version identifier for extensibility and backward compatibility among different versions. The syntax specification of the configuration file also allows data to be written to the peripheral device's Configuration Space in multiple data formats. Once the user's selections have been made, the method updates registers in the peripheral device with the selected option values.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

INTRODUCTION

Figure 1:
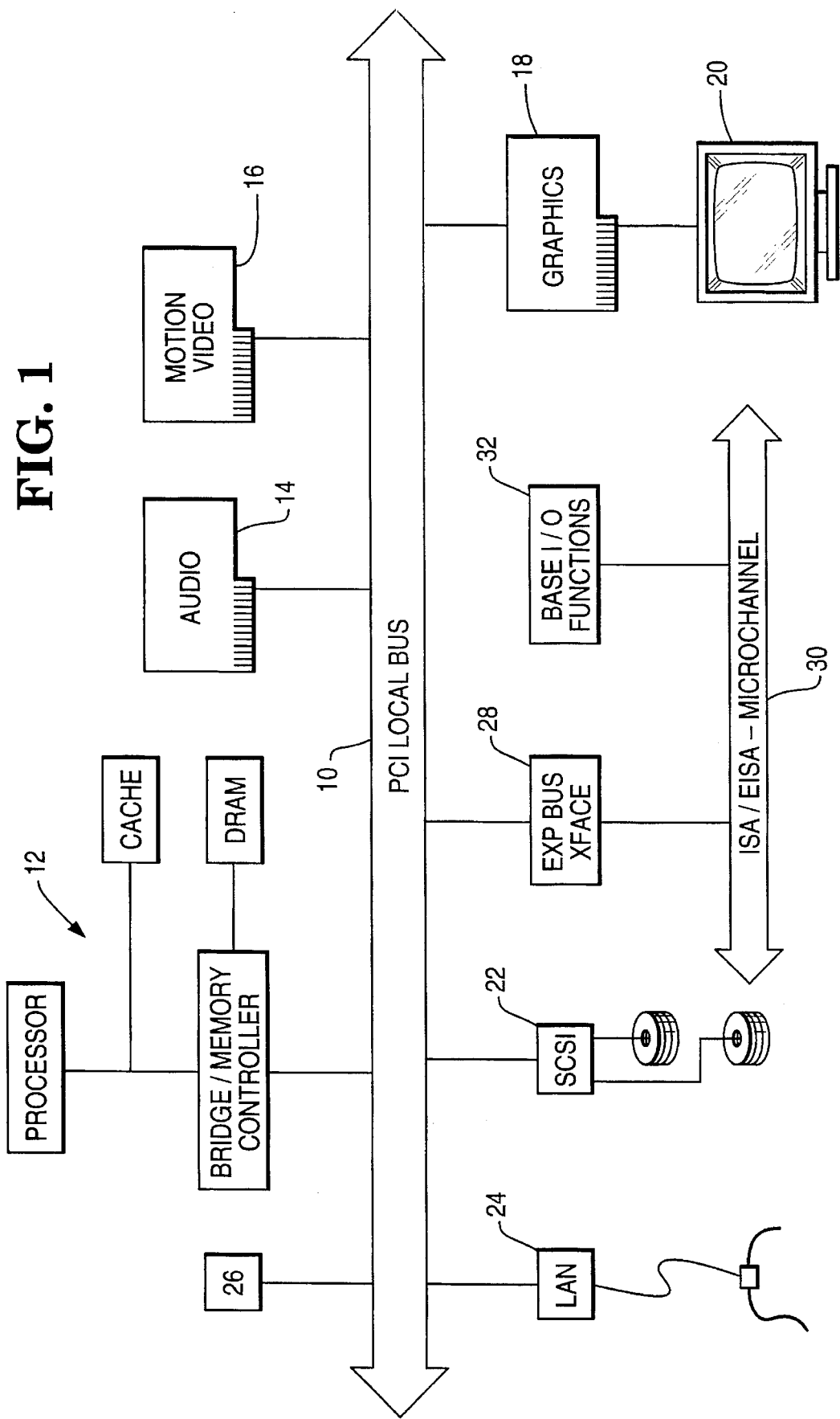
FIG. 1 is a block diagram of an example configuration using the PCI bus.

FIG. 1 is a block diagram of an example configuration using a Peripheral Component Interconnect (PCI) bus 10. The PCI bus 10 is a physical interconnect apparatus intended for use between peripheral devices or adapters and processor/memory systems. The PCI bus 10 is intended as a standard interface at the component level in much the same way that ISA, EISA, or MCA buses are standard interfaces at the board level. Just as ISA, EISA, and MCA buses provide a common I/O board interface across different platforms and different processor generations, the PCI bus 10 is intended to be a common I/O component interface across different platforms and different processor generations. A more complete discussion of the PCI bus 10 is available in the document *PCI Local Bus Specification, Production Version, Revision* 2.0, Apr. 30, 1993, incorporated by reference herein.

In FIG. 1, a processor/memory subsystem 12 is coupled to the PCI bus 10, as are such peripheral adapters as audio boards 14, video boards 16, video graphics controllers 18 for monitors 20, SCSI peripherals 22, LAN interfaces 24, and other peripheral devices 26. Bridge interface logic 28 couples the PCI bus 10 to a standard expansion bus 30 and provides access therebetween for various expansion I/O boards 32. Those skilled in the art will recognize that this example configuration is not intended to imply any specific architectural limits.

As described in more detail below, the present invention proposes a configuration method for peripheral adapters coupled to the PCI bus 10. The peripheral adapters have user-selectable, device-specific configuration options, wherein the options are defined by a PCI Configuration File (PCF) supplied with the peripheral adapter. Initially, the processor accesses a PCF_Required flag in a Configuration Space in the targeted peripheral adapter. If the PCF_Required flag is set, then the processor accesses an Expansion ROM in the peripheral adapter to determine whether the PCF resides in the Expansion ROM. If not found in the Expansion ROM, then the processor examines other non-volatile storage or the operator is prompted to supply a diskette containing the PCF. Once the PCF has been retrieved by the processor, the keywords therein are interpreted to prompt the user for selections among the different configuration options. Once the user selections have been made, the processor updates the appropriate registers in the Configuration Space of the peripheral adapter with the user-selected values and stores the user selections in non-volatile storage for the next boot or cold-start of the system.

The method of the present invention offers a number of advantages over the prior art. One advantage is that the present invention allows users to specify requirements or preferences for peripheral devices. Further, the present invention is both operating system and system architecture independent. The configuration files are formatted using ANSI, ASCII, EBCDIC, or ISO 8859.1 text, so that they are not restricted to any particular platform. Moreover, the syntax specification of the configuration files is extensible, so that revisions can be easily introduced while maintaining backward compatibility with prior versions.

Another advantage is that the syntax specification provides a generic capability to convey device-specific information. The syntax specification is simple and consists of only a few keywords, so that a vendor can use generic text strings to describe configuration registers, functions, features, and options. This eliminates the need for a large and complex keyword list to handle all possible configuration options.

Still another advantage is that the present invention has only a minimal effect on the PCI Specification, even though it comprises an extension beyond the PCI Specification. The present invention needs only a single bit in the PCI-defined Configuration Space to identify those devices that support user selection of configuration options. Moreover, the use of this single bit does not adversely affect peripheral adapters that are not configurable, because the bit will normally default to a value indicating that there are no configuration options.

Still another advantage is that the present invention permits the automatic configuration of peripheral adapters without user intervention. For example, the first "choice" may be programmed as a default choice. In addition, if only a single "choice" is available for a configuration option, then the present invention will automatically select the choice without user intervention.

Still another advantage is that the present invention allows the configuration file to reside in an Expansion ROM on the peripheral adapter. This capability eliminates the need for diskettes containing the configuration file.

Finally, by providing a standardized method for configuring peripheral adapters, the present invention eliminates the need for vendors to design and build their own configuration utilities. Moreover, it eliminates the need for a user to operate multiple configuration utilities for multiple peripheral adapters that may be present in a computer system.

CONFIGURATION SPACE

Figure 2:
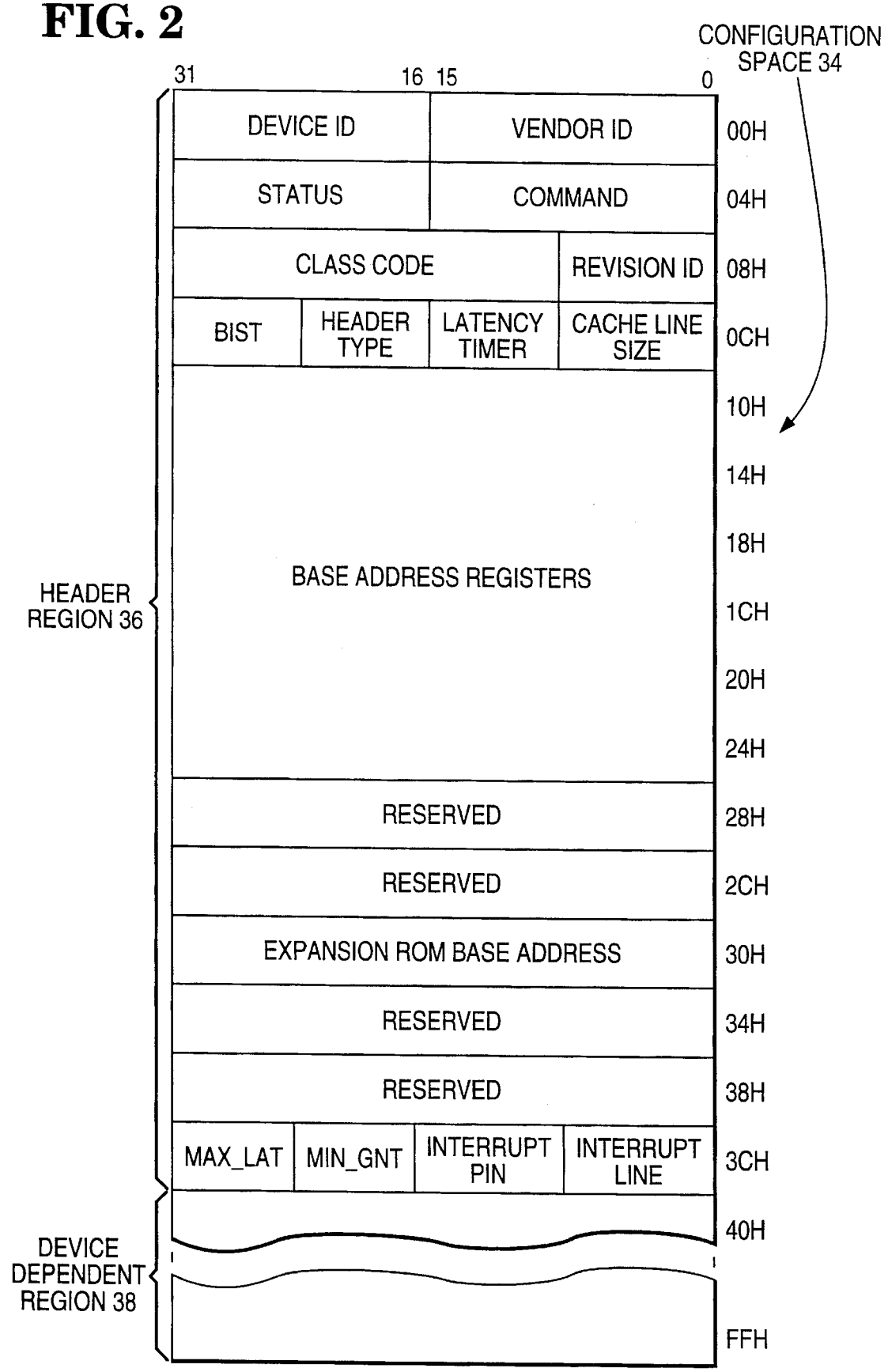
FIG. 2 is a block diagram illustrating the format of the Configuration Space in a PCI adapter.

FIG. 2 is a block diagram illustrating the format of the Configuration Space 34 in the peripheral adapter. The Configuration Space 34 comprises a 256 byte memory divided into a pre-defined header region 36 and a device dependent region 38. The header region 36 begins at address $00_{16}$, extends for a length of 64 bytes, and defines a plurality of fixed registers or fields. The device dependent region 38 begins at address $40_{16}$, extends through to address $FF_{16}$, and supports device-specific registers and functions. For more information on the format of the Configuration Space 34, refer to the document *PCI Local Bus Specification, Production Version, Revision* 2.0, Apr. 30, 1993, incorporated by reference herein.

In the present invention, one of the Reserved registers (at $28_{16}$, $2C_{16}$, $34_{16}$ or $38_{16}$) in the header region 36 will include the PCF_Required field, preferably as a single bit field. A value of "1" in the PCF_Required field will indicate that user selection of one or more configuration options is supported. A value of "0" in the PCF_Required field will indicate that the peripheral adapter does not require user selection of any configuration options.

Typically, one or more registers in the device dependent region 38 of the Configuration Space 34 will relate to the user-selectable configuration options. Depending on the values stored in the registers, the peripheral adapter may operate in different ways.

EXPANSION ROM

Figure 3:
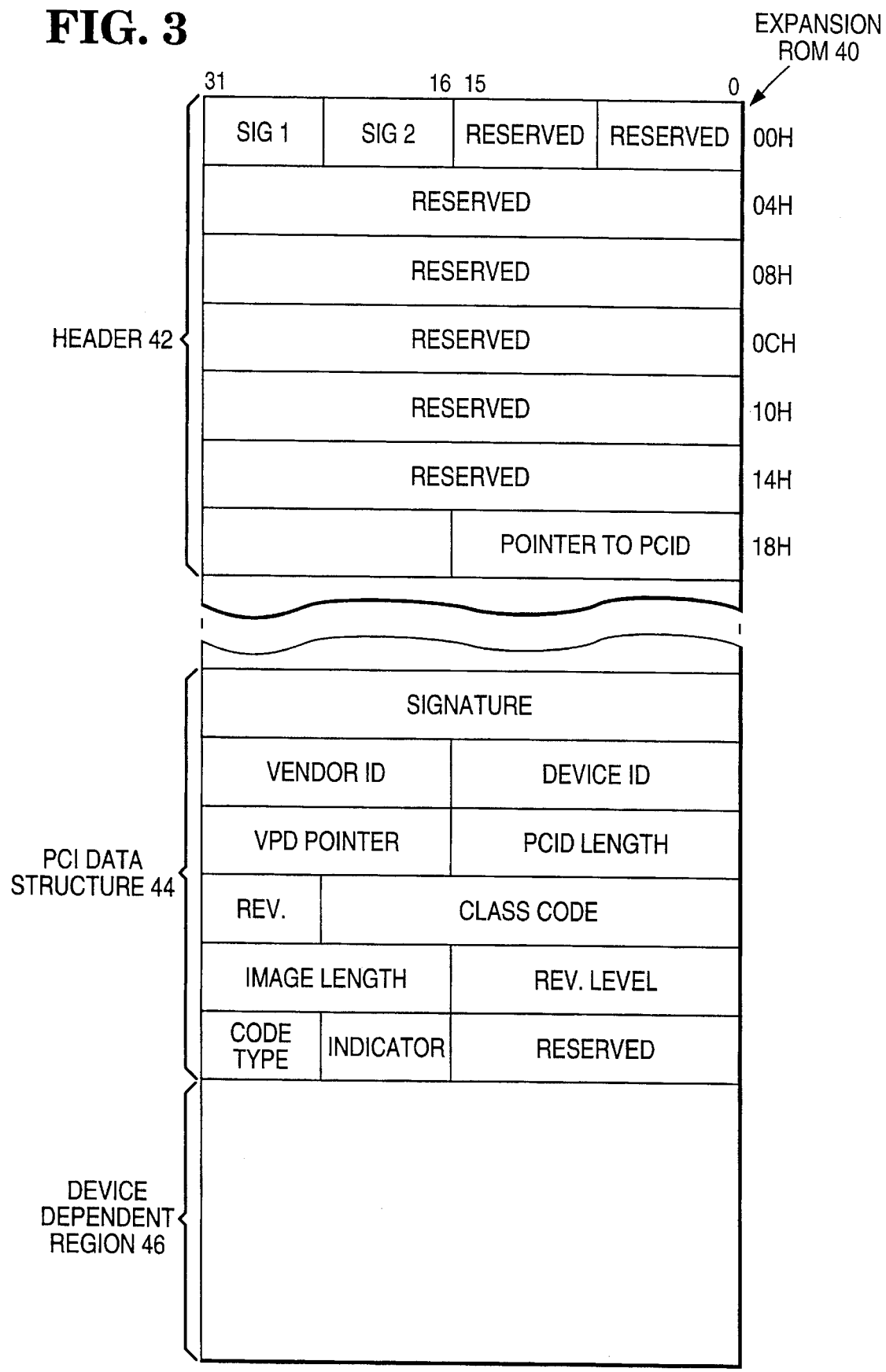
FIG. 3 is a block diagram illustrating the format of the Expansion ROM in a PCI adapter.

FIG. 3 is a block diagram illustrating the format of the Expansion ROM 40 in the peripheral adapter. The Base Address of the Expansion ROM 40 is stored in the header region 36 of the Configuration Space 34 at address $30_{16}$. The Expansion ROM 40 comprises a variable length memory divided into a plurality of image regions, each of which contain a pre-defined Expansion ROM header region 42, a pre-defined PCI Data Structure region 44, and a device-dependent region 46. The header region 42 begins at address $00_{16}$, extends for a length of 24 bytes, and defines a plurality of fixed registers or fields. The header region 42 includes a pointer to the PCI Data Structure region 44 that is located somewhere in the first 64 K bytes of the ROM. The PCI Data Structure region 44 extends for a length of 24 bytes and defines a plurality of fixed registers or fields. The device dependent region 46 begins immediately after the PCI Data Structure 44, extends through the end of the image region, and stores device-specific information. For more information on the format of the Expansion ROM 40, refer to the document *PCI Local Bus Specification, Production Version, Revision* 2.0, Apr. 30, 1993, incorporated by reference herein.

If the Code Type field of the PCI Data Structure 44 contains a specified value, then the device dependent region 46 will contain a PCF for the peripheral adapter. The use of the Expansion ROM 40 to store the PCF eliminates the need for diskettes in the configuration process.

CONFIGURATION TRANSACTIONS

Figure 4:
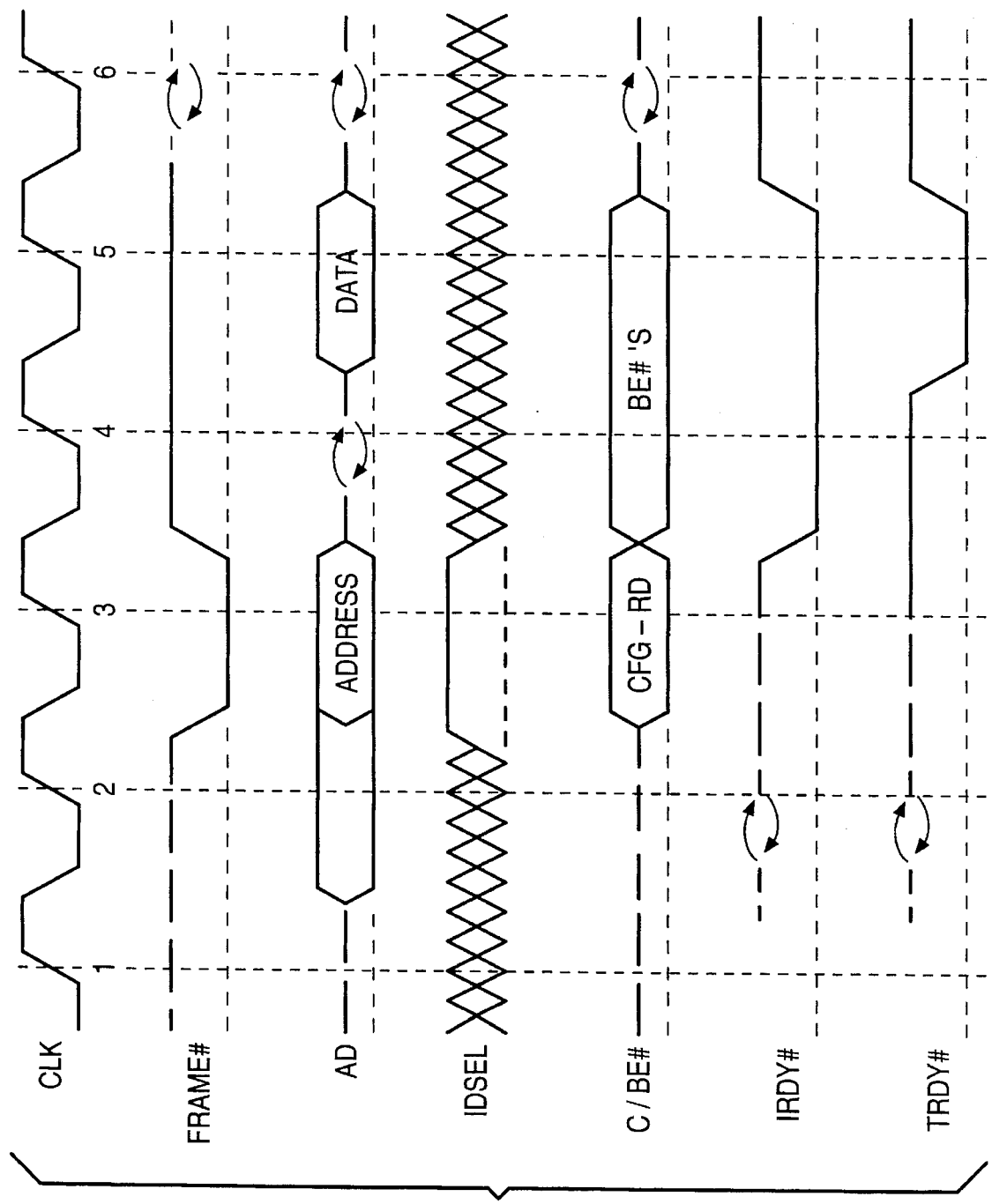
FIG. 4 is a timing chart illustrating a Configuration Read transaction between the processor and the PCI adapter.

FIG. 4 is a timing chart illustrating a Configuration Read transaction between the processor and the peripheral adapter, wherein the processor can access and read data from the Configuration Space and Expansion ROM of the peripheral adapter. A Configuration Write command would use a similar sequence to write to the Configuration Space. For more information on PCI bus transactions, refer to the document *PCI Local Bus Specification, Production Version, Revision* 2.0, Apr. 30, 1993, incorporated by reference herein. A selected subset of the signals used in FIG. 4 are described below:

CLK The CLK (Clock) signal provides timing for all transactions on the PCI bus and is an input to every device. All other PCI bus signals are sampled on the rising edge of the CLK signal, and all other timing parameters are defined with respect to this edge. It is expected that the PCI bus may operate over a wide range of frequencies for the CLK signal.

FRAME# The FRAME# (Cycle Frame) signal is driven by the current master device to indicate the beginning and duration of an access. The FRAME# signal is asserted to indicate a bus transaction is beginning. While the FRAME# signal is asserted, data transfers continue. When the FRAME# signal is de-asserted, the transaction is in the final data phase.

AD The AD[31::00] (Address and Data) signals are multiplexed on the same pins of the PCI bus. During the first clock of a transaction, the AD signals contain a 32-bit target device address. During subsequent clocks, the AD signals contain up to 4 bytes of data.

IDSEL The IDSEL (Initialization Device Select) signal is used as a chip select in lieu of the upper 24 address lines during Configuration Read and Write transactions.

C/BE# The C/BE#[3::0] (Bus Command and Byte Enable) signals are multiplexed on the same pins of the PCI bus. During the address phase of a transaction, the C/BE# signals define a bus command. During the data phase of the transaction, the C/BE# signals are used as "Byte Enables" for the 32 AD signals. The Byte Enables determine which byte lanes, i.e., 8-bit groups, of the AD signals carry meaningful data. For example, the C/BE#[0] signal applies to byte 0 of the AD signals, and the C/BE#[3] signal applies to byte 3 of the AD signals.

IRDY# The IRDY# (Initiator Ready) signal indicates the initiating device's (master device's) ability to complete the current data phase of the transaction. The IRDY# signal is used in conjunction with the TRDY# signal. A data phase is completed on any clock that both the IRDY# and TRDY# signals are asserted. During a write, the IRDY# signal indicates that valid data is present on the AD signals. During a read, the IRDY# signal indicates that the master device is prepared to accept data. Wait cycles are inserted until botch the IRDY# and TRDY# signals are asserted together.

TRDY# The TRDY# (Target Ready) signal indicates the target device's ability to complete the current data phase of the transaction. The TRDY# signal is used in conjunction with the IRDY# signal described below. A data phase is completed on any clock where both the TRDY# and IRDY# signals are asserted. During a read, the TRDY# signal indicates that valid data is present on the AD signals. During a write, the TRDY# signal indicates that the target device is prepared to accept data. Wait cycles are inserted until both the IRDY# and TRDY# signals are asserted together.

For more information on other signals used on the PCI bus, refer to the document *PCI Local Bus Specification, Production Version, Revision* 2.0, Apr. 30, 1993, incorporated by reference herein.

In FIG. 4, bus ownership is granted to a master device, e.g., the processor, sometime before clock period #1. After being granted ownership, the FRAME# signal is asserted during clock period #2 by being driven to a low voltage by the processor to indicate the beginning of the Configuration Read transaction between the processor and the peripheral adapter. The first clock edge on which the FRAME# signal is asserted, i.e., clock period #3, is the address phase, and the address and bus command codes are transferred by the AD and C/BE# signals on that clock edge. Normally, each device decodes its own address for normal accesses. However, accesses in the Configuration Space and the Expansion ROM require that device selection decoding be done externally and signalled to the peripheral adapter via the IDSEL signal, which functions like a classic "chip select" signal. After the address phase in which the Configuration Read command is decoded and IDSEL is asserted, i.e., clock period #3, the peripheral adapter responds with a DEVSEL# signal (not shown).

Internal addressing of the Configuration Space and the Expansion ROM is done by the AD and C/BE# signals. The Configuration Read (or Write) command allows accesses on a byte, word, double word boundary, and/or as a burst operation. The rest of the transaction is the same as other commands described in the document *PCI Local Bus Specification, Production Version, Revision* 2.0, Apr. 30, 1993, incorporated by reference herein, including all termination semantics.

The next clock edge, i.e., clock period #4, begins the first of one or more data phases, during which data is transferred by the AD signals between the processor and the peripheral adapter on each clock edge for which both the IRDY# and TRDY# signals are asserted by the processor and the peripheral adapter, respectively. Wait cycles may be inserted in the data phases by either the processor or the peripheral adapter by de-asserting the IRDY# and TRDY# signals, respectively. At such time as the processor intends to complete only one more data transfer (which could be immediately after the address phase), the FRAME# signal is de-asserted and the IRDY# signal is asserted indicating the processor is ready. After the peripheral adapter indicates the final data transfer, by asserting the TRDY# signal, the PCI bus returns to the idle state with both the FRAME# and IRDY# signals de-asserted.

PCI CONFIGURATION FILES

Following is a description of the PCF syntax specification. Note that in the description that: (1) optional keywords and fields are enclosed in brackets ([]); (2) curly braces ({}) indicate a list of options, wherein a vertical bar (|) provides a separator for the options within the list; and (3) values are generally specified in either hexadecimal or binary format, wherein hexadecimal numbers end with the character "h" and binary numbers end with the character "b". Of course, those skilled in the art will recognize that any number of different syntax conventions and keywords could be used in the present invention, and that the syntax specification described below is not intended to limit the present invention to the precise form disclosed herein.

VENDOR xxxxh

DEVICE xxxxh

PCFDEF xxh

The VENDOR and DEVICE keywords must match the equivalent fields in the Configuration Space of the peripheral adapter. The PCFDEF parameter indicates the version of the syntax specification.

LANG {DAN|DUT|ENG|FIN|FRE|GER|ITA|NOR|POR|SPA|SWE}

The LANG keyword is followed by a parameter that indicates the language choice for display to the operator, wherein DAN is Danish, DUT is Dutch, ENG is English, FIN is Finnish, FRE is French, GER is German, ITA is Italian, NOR is Norwegian, POR is Portuguese, SPA is Spanish, and SWE is Swedish. The LANG keyword indicates that any quote-enclosed text within a following block is in the language specified. A language block continues until the next LANG keyword is encountered, or the end of the PCF is reached.

UDFn "User Definable Feature description" s:aah [,s:bbh,...,s:zzh]

The UDFn parameter indicates a User-Definable Feature. The n is used to provide a label to the UDF statement. It must be a value from 0–99 (decimal) and each value of n within a language block must be unique. UDFn is followed by the description of the feature in quote-enclosed text, followed by a list of Configuration Space registers affected by the feature. The format of the list includes at least one register size/offset description. The register size/offset is shown as s:xxh, where s: is the size indicator and xxh is the register's offset from the beginning of the Configuration Space. The h indicates the offset is in hexadecimal. The size indicator can be B: for byte, W: for word, or D: for double word. If more than one register is affected, they are not required to have the same size or be in any address order.

"Choice 1 description" {yyyyyyyyb|zzhh|zzzzhh|zzzzzzzzh} [,{yyyyyyyyb|zzhh|...},...] [,OFFm, ...]

...

"Choice x−1 description" zzh[,zzzzh,...][,OFFm,...]

"Choice x description" zzh[,zzzzh,...][,OFFm,...]

The quote-enclosed choice description is followed by the register information. A byte-sized register value can be specified in binary or hexadecimal format. Word-sized and double word ed register values can only be specified in hexadecimal format. In binary, each bit is described as either an X (or x), 1 (set), or 0 (reset), and is followed by a "b" to indicate it is binary. In hexadecimal, each nibble is described as either an X (or x) or a value from 0–F (or 0–f), and is followed by an "h" to indicate it is hexadecimal. The X indicates that this bit or nibble should not be modified when data is written to the specified offset in the Configuration Space. These register encodings correspond to the order and size in which they were defined in the UDFn description. The choice description can also optionally disable other UDFn definitions to support conditional User Definable Features, where the presentation of a user feature is dependent on choice selections made previously. By default, a UDFn is enabled unless specifically disabled by a choice description. Note that a choice description cannot disable its corresponding UDFn. Note also that a UDFn can be disabled by using an OFFm keyword, where the m of the OFFm matches the n of the UDFn.

HELP "Help text"
    The HELP keyword and quote-enclosed text are optional. If provided in the PCF, it must follow the final choice of a UDFn.

ENDPCF
    The ENDPCF keyword specifies the end of the PCF. Any information that follows the ENDPCF keyword will not be parsed.

;
    The ; keyword specifies the beginning of a comment through to the next carriage return.

SAMPLE PCI CONFIGURATION FILE

Following is a sample PCF illustrating the use of the format of the syntax specification:

```
VENDOR 1234h        ; The Vendor ID is 1234h
DEVICE 5678h        ; The Device ID is 5678h
PCFDEF 01h          ; PCF version 1
LANG ENG            ; English language block follows
UDF0 "Type of Widget Communications" B:45h, D:8Ch
; Sets values at 45h (byte) and 8Ch (doubleword)
; If "RF" is selected by user, then disable
; prompting for UDF1 and UDF2.
"Serial"            xxx000xxb, ABDCXXXXh
"Parallel"          xxx010xxb, 1234XXXXh
"RF"                xxx100xxb, 5678abcdh, OFF1, OFF2
HELP "This choice lets you select which type of
communication mechanism you want this device to use"
UDF1 "Communication Speed" W:56h
"4 Mbit/Sec" X12Xh, OFF2    ; run at 4 Megabit/Second
"16 Mbit/Sec" X4cXh, OFF2   ; run at 16 Megabit/Second
"64 Gbit/Sec" X00Xh         ; run at 64 Gigabit/Second
UDF2 "Enable Super Hyper Turbo Mode" B:49h ;set byte at 49h
"No"                XXXXX0XXb
"Yes"               XXXXX1XXb
HELP "Enable Super Hyper Turbo Mode only if the 64 Gbit
Speed has been selected"
UDF3 "Widget Host ID" B:9Ah
"7" xxxxx000b
"6" xxxxx001b
"5" xxxxx010b
"4" xxxxx011b
ENDPCF    ; End of the PCF
```

CONFIGURATION UTILITY

FIGS. 5A–5G together are a flowchart illustrating the steps performed by the present invention.

Figure 5A:
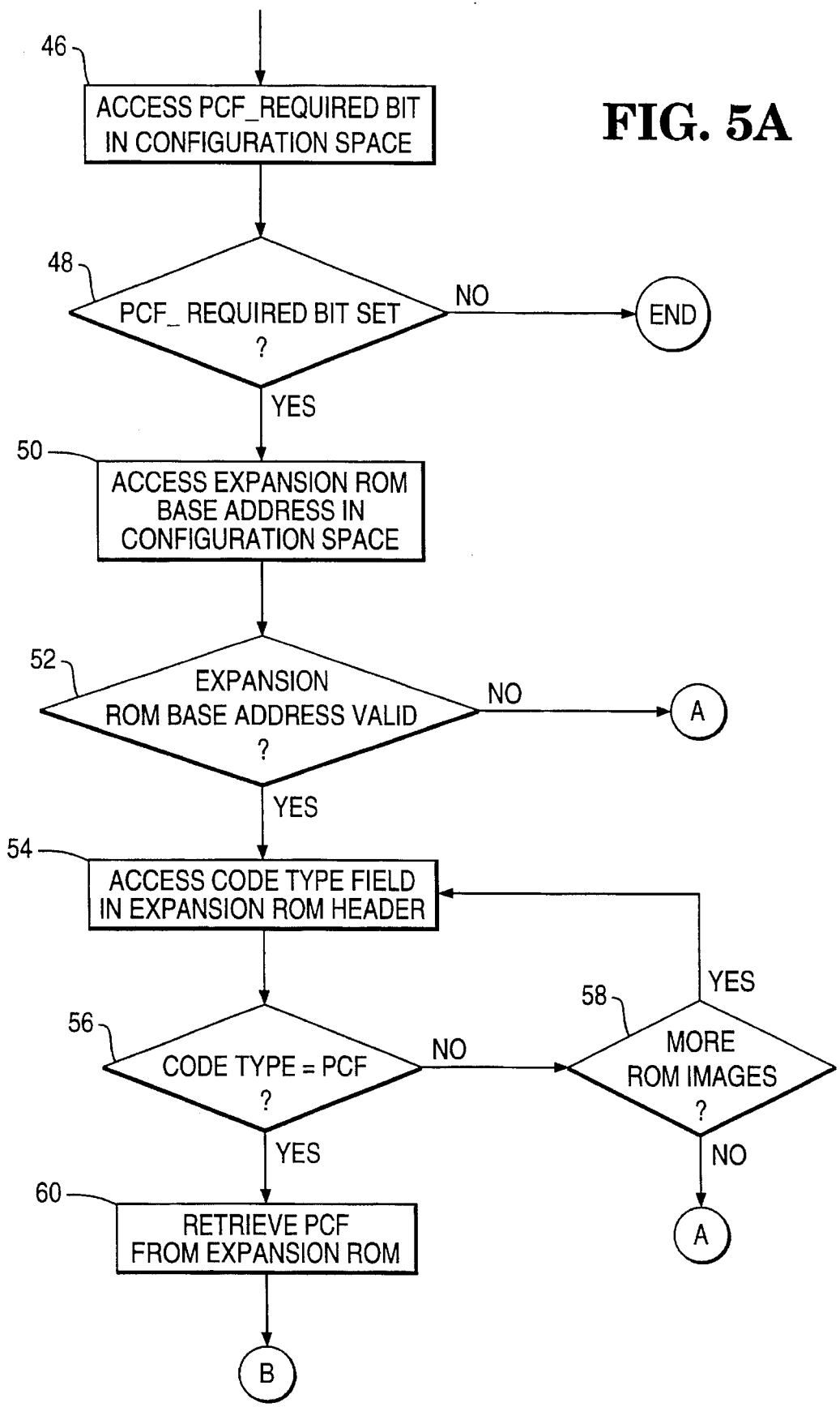
FIGS. 5A–5G together are a flowchart illustrating the steps performed by a configuration utility program executed by the processor.

FIG. 5A is a flowchart illustrating the steps performed in determining whether the peripheral adapter supports user-selectable configuration options and in determining whether the PCF resides in an Expansion ROM 40 of the adapter. Block 46 represents the processor accessing the PCF_ Required bit in a Reserved byte in the header region 36 of the Configuration Space 34. Decision block 48 represents the processor determining whether the PCF_Required bit is set in the header region 36 of the Configuration Space 34. If not, the configuration process for device-specific items ends. Otherwise, block 50 represents the processor accessing the Expansion ROM Base Address field in the header portion 36 of the Configuration Space 34. Decision block 52 represents the processor determining whether the value in the Expansion ROM Base Address field is valid. If not, control transfers to "A". Otherwise, block 54 represents the processor accessing the Code Type field in the PCI Data Structure 44 of the first image region of the Expansion ROM 40. Decision block 56 represents the processor determining whether the Code Type field contains a "PCF" value. If not, control transfers to block 58. Block 58 is a decision block that determines whether there are additional image regions in the Expansion ROM 40. If not, control transfers to "A". Otherwise, control transfers to block 54 to access the Code Type field in the PCI Data Structure 44 of the next image region of the Expansion ROM 40. If the processor determines at block 56 that the Code Type field contains a "PCF" value, then block 60 represents the processor retrieving the PCF from the device dependent region 46 of the Expansion ROM 40. Control then transfers to "B".

Figure 5B:
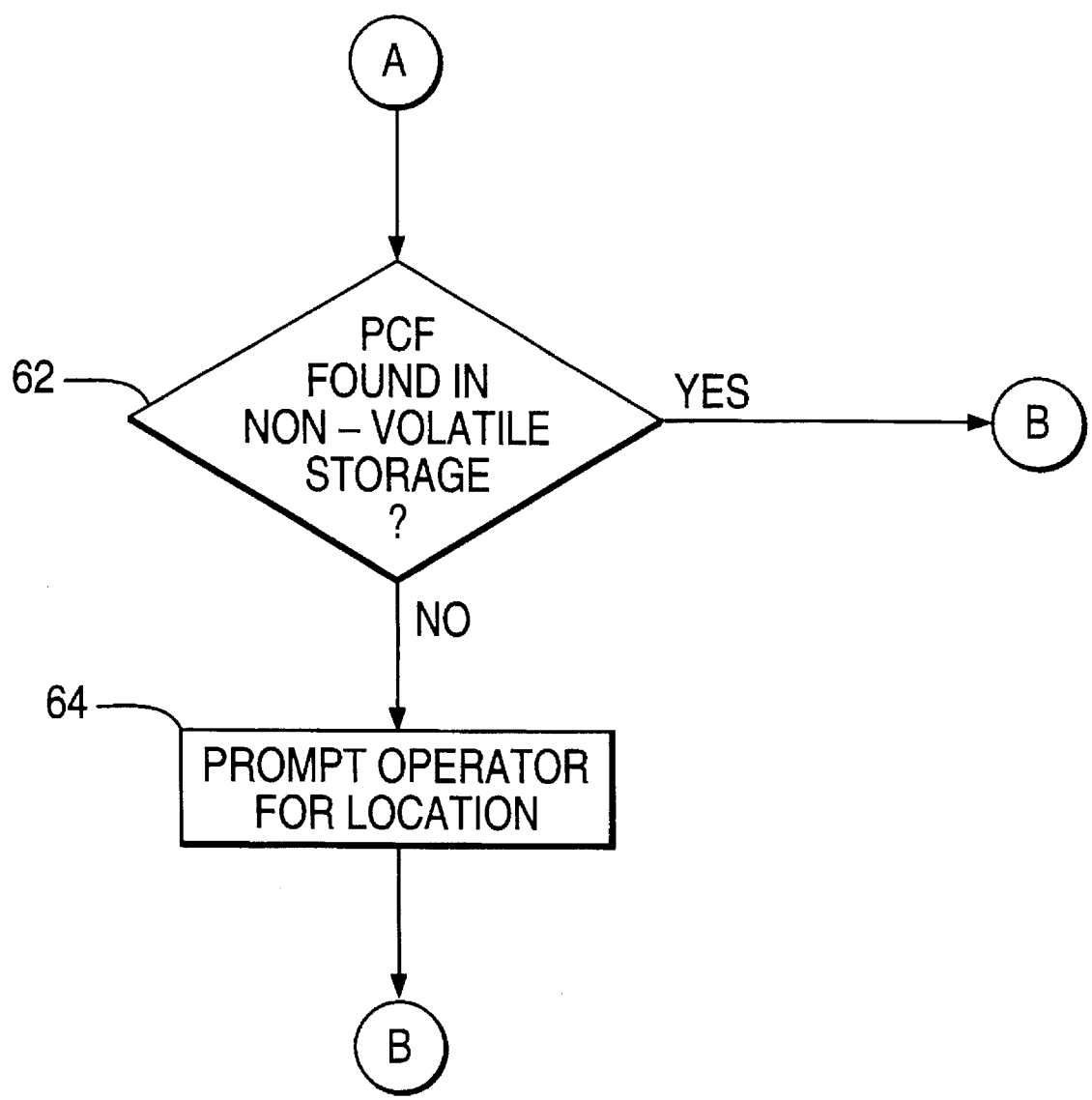

FIG. 5B is a flowchart illustrating the steps performed at "A" when the PCF resides in non-volatile storage, e.g., on a hard drive or diskette, and not in the Expansion ROM 40 of the peripheral adapter. Decision block 62 represents the processor searching non-volatile storage for the PCF. Preferably, the filename for the PCF should be XXXX-YYYY.PCF, where XXXX is a two byte Device Id as specified in the header region 36 of the Configuration Space 34 (represented as hexadecimal digits), and YYYY is a two byte Vendor Id as specified in the header region 36 of the Configuration Space 34 (represented as hexadecimal digits). If the processor does not find the PCF in non-volatile storage, control is transferred to block 64 to prompt the operator for the location of the PCF. Otherwise, control is transferred to "B".

Figure 5C:
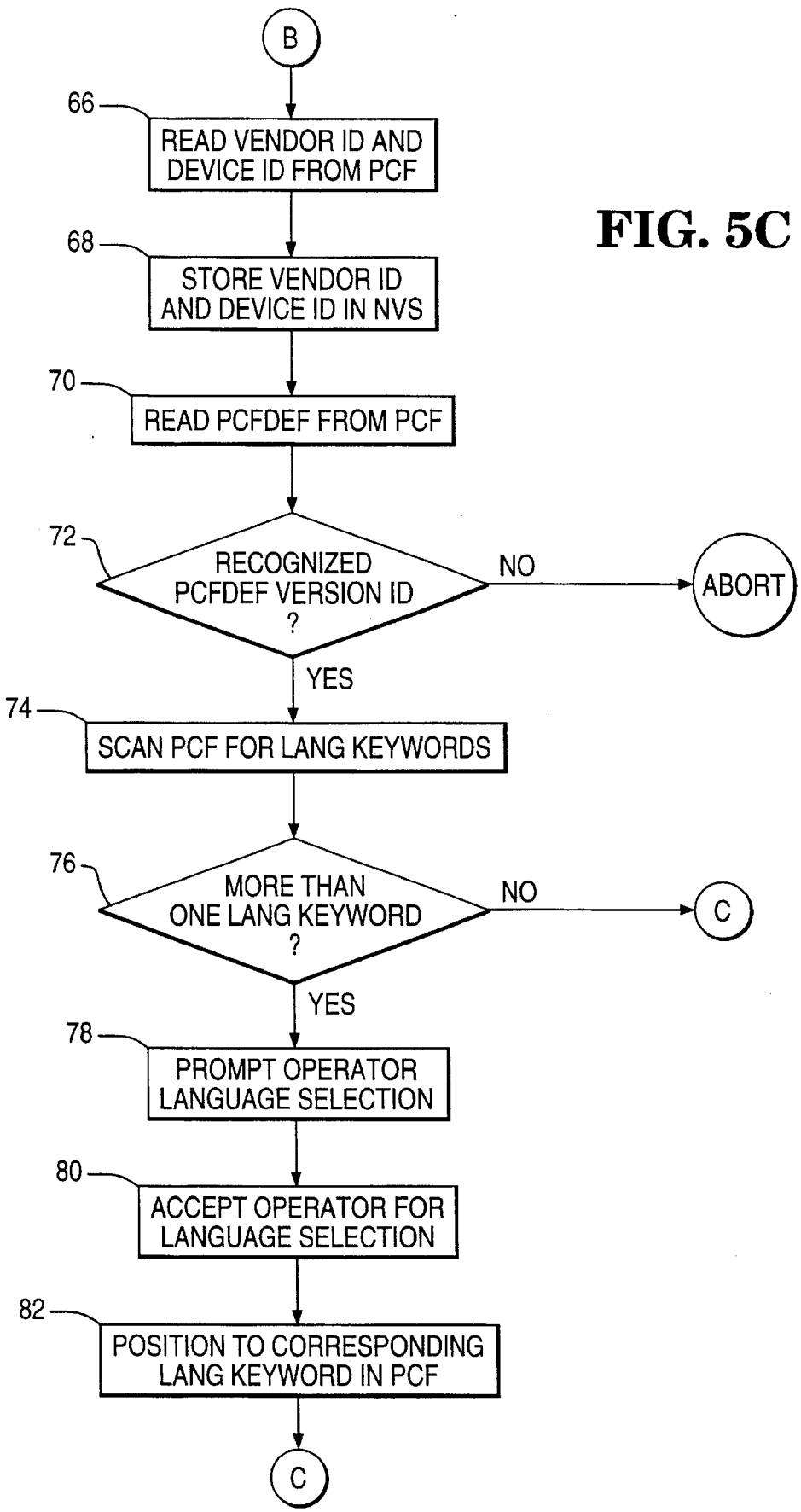

FIG. 5C is a flowchart illustrating the steps performed at "B" when the PCF has been retrieved, either from the Expansion ROM or other non-volatile storage. Block 66 represents the processor reading the Vendor ID and Device ID from the PCF. Block 68 represents the processor storing the Vendor ID and the Device ID in non-volatile storage. Block 70 represents the processor reading the PCFDEF keyword and parameter from the PCF. Decision block 72 represents the processor determining whether the PCFDEF refers to a recognized, i.e., valid, version identifier. If not, then the configuration process aborts. Otherwise, block 74 represents the processor scanning the PCF for LANG keywords. Decision block 76 represents the processor determining whether there are more than one LANG keywords in the PCF. If not, control transfers to "C". Otherwise, block 78 represents the processor prompting the operator for a language selection. Block 80 represents the processor accepting the operator language selection. Block 82 represents the processor positioning to the language block identified by the corresponding LANG keyword in the PCF to process the language block. Control then transfers to "C".

Figure 5D:
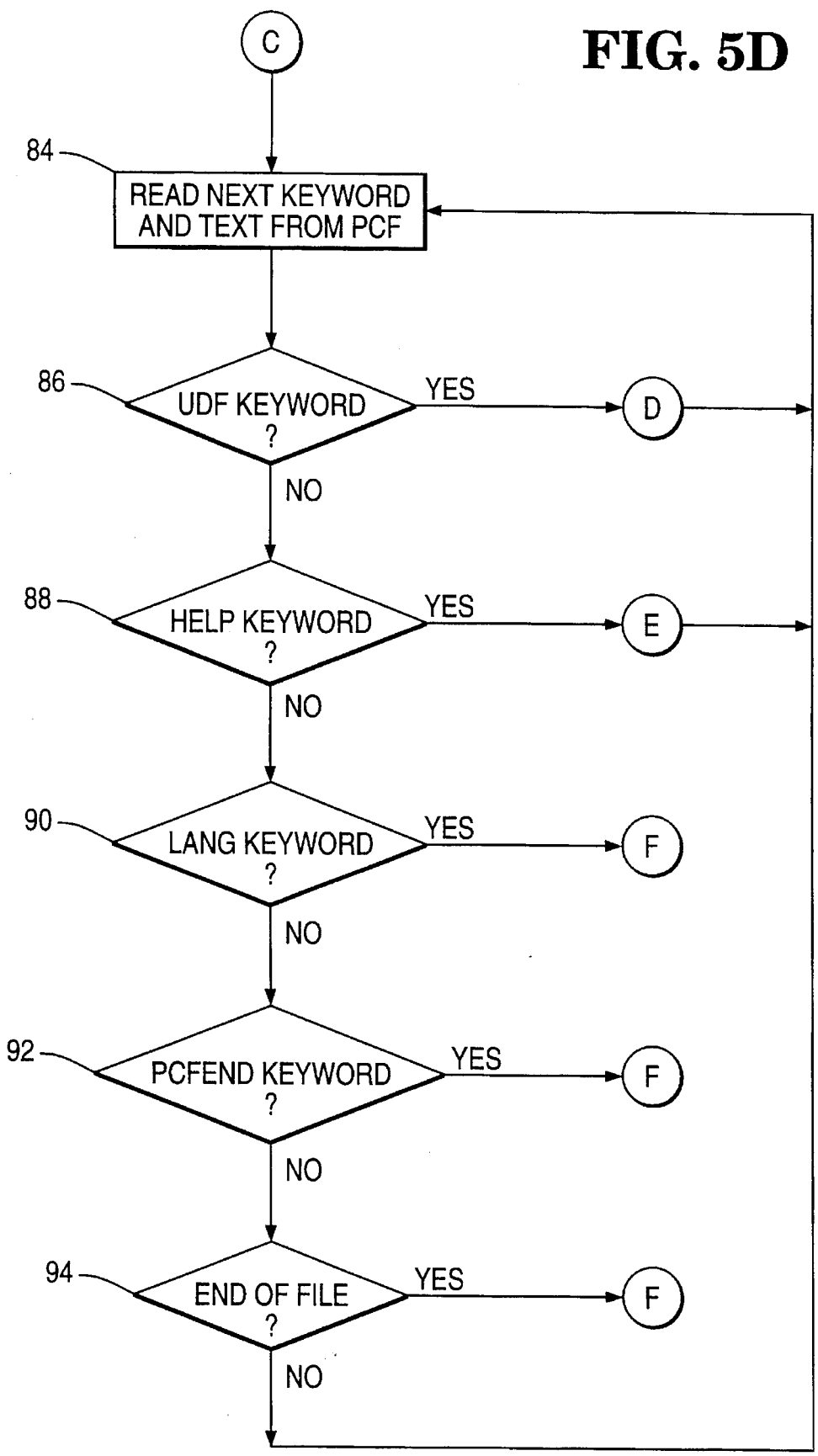

FIG. 5D is a flowchart illustrating the steps performed at "C", wherein the PCF keywords are processed and acted upon. Block 84 represents the processor reading the next keyword and its associated parameters from the PCF. Decision block 86 represents the processor determining whether the next keyword is "UDF". If so, control is transferred to "D" for processing of the "UDF" keyword and its parameters, and thereafter control returns to block 84. Decision block 88 represents the processor determining whether the next keyword is "HELP". If so, control is transferred to "E" for processing of the "HELP" keyword and its parameters, and thereafter control returns to block 84. Decision block 90 represents the processor determining whether the next keyword is "LANG". If so, control is transferred to "F". Decision block 92 represents the processor determining whether the next keyword is "PCFEND". If so, control is transferred to "F". Decision block 94 represents the processor determining whether the end of the PCF has been reached. If so, control is transferred to "F". Otherwise, the processor reads the next keyword from the PCF at block 84.

Figure 5E:
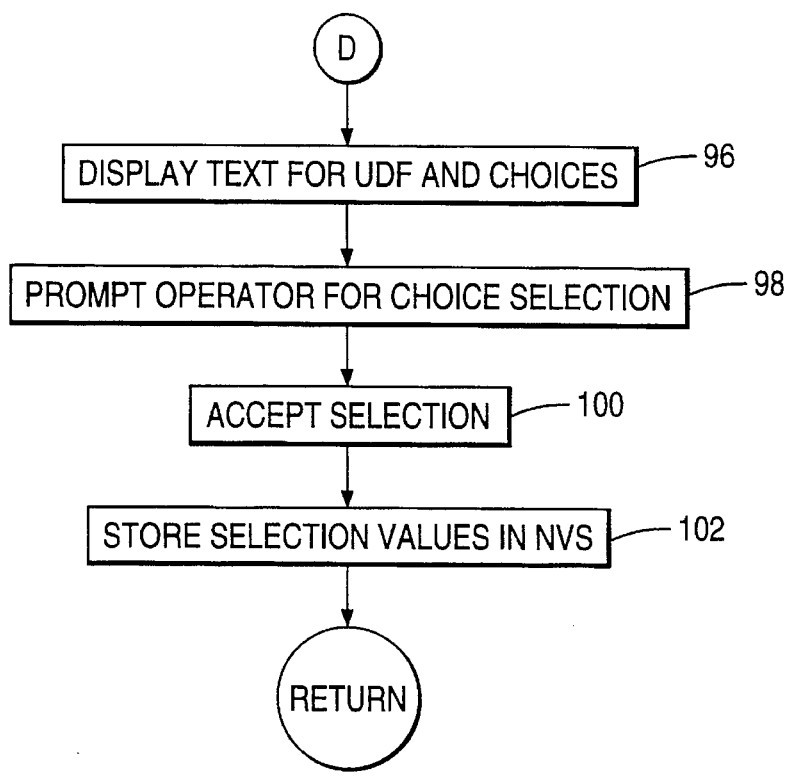

FIG. 5E is a flowchart illustrating the steps performed at "D", which represents the processing of the UDF keyword. These steps are bypassed if the "OFF" parameter has been set due to a prior user selection. Block 96 represents the processor displaying the UDF description and its associated choices. Block 98 represents the processor prompting the operator for a choice selection. Block 100 represents the processor accepting the operator's selection. Block 102 represents the processor storing the selection values in non-volatile storage.

Figure 5F:
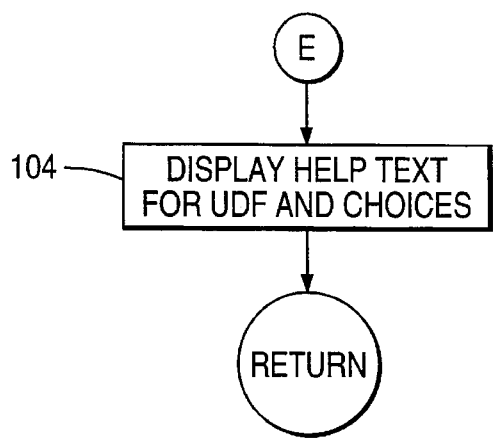

FIG. 5F is a flowchart illustrating the steps performed at "E", which represents the processing of the HELP keyword. Block 104 represents the processor displaying the help text for the UDF and its associated choices.

Figure 5G:
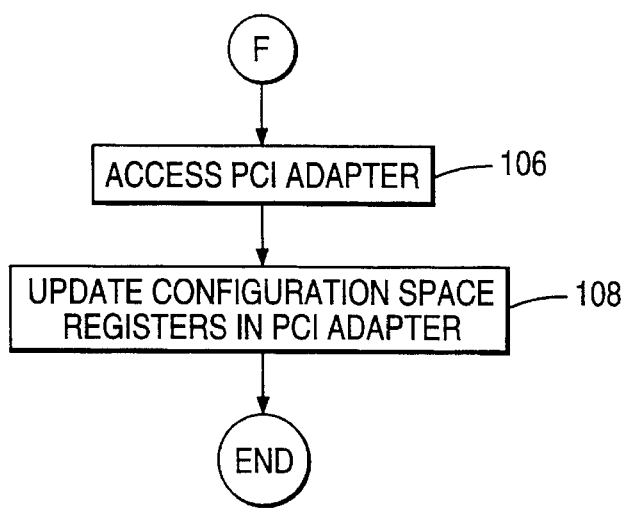

FIG. 5G is a flowchart illustrating the steps performed at "F", which represents the processing of the completed PCF. Block 106 represents the processor accessing the peripheral adapter and block 108 represents the processor updating the appropriate registers in the Configuration Space 34 of the peripheral adapter, using the values stored in non-volatile storage during the configuration process. The same functions are also performed by Power-On Self-Test (POST) software at system boot time and during future system boots to ensure that the registers in the Configuration Space 34 are correctly initialized.

CONCLUSION

This concludes the description of the preferred embodiment of the invention. In summary, a method has been described which provides for the configuration of peripheral adapters. The method examines a flag in the peripheral adapter to determine if user-selectable configuration options are required. If the flag is set, then a configuration file is retrieved. The configuration file may reside within a Read Only Memory (ROM) in the peripheral adapter. The configuration file is interpreted to determine how the peripheral adapter should be configured and to determine how the configuration options should be presented to the user. Such configurations options may be conditional and based on previous user selections. Multiple language formats are supported within a single configuration file to eliminate the need to maintain separate files. The syntax specification of the configuration file includes a version identifier for extensibility and backward compatibility among different versions. The syntax specification of the configuration file also allows data to be written to the peripheral adapter in multiple data formats. Once the user's selections have been made, the method updates registers in the peripheral adapter with the selected option values.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for configuring a peripheral coupled to a computer, the peripheral comprising a memory including an indicating register signifying whether the peripheral has user-selectable operating parameters and a configuration space, the configuration space comprising at least one configuration file and one or more configuration registers for setting the user-selectable operating parameters of the peripheral, each configuration file having a version indicator and a plurality of user selectable settings, the method comprising the steps of:

(a) accessing the indicating register in the peripheral;

(b) accessing the configuration space in the peripheral when the value stored in the indicating register indicates that the peripheral has one or more user-selectable operating parameters;

(c) interpreting the configuration file's contents to identify the user selectable settings for the user-selectable operating parameters of the peripheral and to determine how the user-selectable setting options should be presented to the user, comprising the steps of reading the version indicator and identifying the user-selectable settings according to the version indicator;

(d) presenting the user-selectable settings for the user-selectable operating parameters of the peripheral to a user;

(e) accepting a selection of one of the user-selectable settings for each of the user-selectable operating parameters of the peripheral from the user in the computer; and (f) setting the operating parameters of the peripheral according to the selected settings by storing a value from the configuration file into one or more of the configuration registers in the configuration space.

2. The invention as set forth in claim 1 above, wherein the configuration file is stored in non-volatile storage.

3. The invention set forth in claim 1 above wherein the configuration file further comprises one or more conditional operators defining user-selectable options based on previously selected user selections, and the presenting step (d) comprises the step of presenting the user-selectable settings of the peripheral to the user in accordance with a previously accepted user selection and the conditional operator.

4. The invention as set forth in claim 1 above, wherein the configuration space further comprises a configuration header, the configuration header having one or more registers identifying the location of the configuration file, and the step of accessing the configuration space further comprises the steps of:

accessing the configuration header;

interpreting the configuration header registers to determine the location of the configuration file; and accessing the configuration file.

5. The invention as set forth in claim 1 above, wherein the configuration file is divided into a plurality of blocks corresponding to a plurality of languages, and each of the blocks comprises the user-selectable settings for the user-selectable operating parameters of the peripheral as described in the corresponding language, and the presenting step (d) comprises the steps of prompting the user for a language selection, accepting a language selection from the user, and presenting the user-selectable operating parameters of the peripheral to the user from the block corresponding to the language selection.

6. The invention set forth in claim 5 above, wherein the presenting step (d) further comprises the steps of selecting a default language selection and presenting the user-selectable settings for the user-selectable operating parameters of the peripheral to the user from the block corresponding to the default language selection.

7. A method for configuring a peripheral adapter coupled to a computer, comprising the steps of:

(a) accessing a configuration space in the peripheral adapter when the peripheral adapter has one or more user-selectable operating parameters, the configuration space having a configuration file and one or more configuration registers, the configuration file having a plurality of user-selectable operating parameters of the peripheral adapter;

(b) interpreting the configuration file's contents according to the version indicator to identify the user-selectable settings for the user-selectable operating parameters of the peripheral adapter, wherein the configuration file includes a version indicator and the configuration file's contents are interpreted according to the version indicator;

(c) presenting the user-selectable settings for the user-selectable operating parameters of the peripheral adapter to a user;

(d) accepting a selection of one of the user-selectable settings for each of the user selectable operating parameters of the peripheral adapter from the user; and (e) setting the operating parameters of the peripheral adapter according to the selected settings by storing a value from the configuration file into one or more configuration registers in the configuration space.

8. The invention set forth in claim 7 above, wherein the configuration file is stored in non-volatile storage.

9. The invention set forth in claim 7 above, wherein the configuration file further comprises one or more conditional operators defining user-selectable options based on previously selected user selections, and the presenting step (c) comprises the step of presenting the user-selectable settings of the peripheral adapter to the user in accordance with a previously accepted user selection and the conditional operator.

10. The invention as set forth in claim 7 above, wherein the configuration space further comprises a configuration header, the configuration header having one or more registers identifying the location of the configuration file, and the step of accessing the configuration space further comprises the steps of:

accessing the configuration header;

interpreting the configuration header registers to determine the location of the configuration file; and accessing the configuration file.

11. The invention as set forth in claim 7 above, wherein the configuration file is divided into a plurality of blocks corresponding to a plurality of languages, and each of the blocks comprises the user-selectable settings for the user-selectable operating parameters of the peripheral adapter as described in the corresponding language, and the presenting step (c) comprises the steps of prompting the user for a language selection, accepting a language selection from the user, and presenting the user-selectable operating parameters of the peripheral adapter to the user from the block corresponding to the language selection.

12. The invention set forth in claim 11 above, wherein the presenting step (c) further comprises the steps of selecting a default language selection and presenting tile user-selectable settings for the user-selectable operating parameters of the peripheral adapter to the user from the block corresponding to the default language selection.

13. An apparatus for configuring a peripheral comprising a memory including an indicating register signifying whether the peripheral has user-selectable operating parameters and a configuration space, the configuration space comprising at least one configuration file and one or more configuration registers for setting the user-selectable operating parameters of the peripheral, each configuration file having a version indicator and a plurality of user-selectable settings, the apparatus comprising:

(a) a computer coupled to the peripheral having a processor, a memory, a data input device, and a display;

(b) means, performed by the computer, for performing the steps of:

(i) accessing the indicating register in the peripheral;

(ii) accessing the configuration space in the peripheral when the value stored in the indicating register indicates that the peripheral has one or more user-selectable operating parameters;

(iii) interpreting the configuration file's contents to identify the user selectable settings for the user-selectable operating parameters of the peripheral and to determine how the user-selectable setting options should be presented to the user, comprising the steps of reading the version indicator and identifying the user-selectable settings according to the version indicator;

(iv) presenting the user-selectable settings for the user-selectable operating parameters of the peripheral to a user;

(v) accepting a selection of one of the user-selectable settings for each of the user-selectable operating parameters of the peripheral from the user in the computer; and (vi) setting the operating parameters of the peripheral according to the selected settings by storing a value from the configuration file into one or more of the configuration registers in the configuration space.

14. The invention set forth in claim 13 above, wherein the configuration file is stored in non-volatile storage.

15. The invention set forth in claim 13 above, wherein the configuration file further comprises one or more conditional operators defining user-selectable options based on previously selected user selections, and the means for performing the presenting step (iv) comprises means for presenting the user-selectable settings of the peripheral to the user in accordance with a previously selected user selection and the conditional operator.

16. The invention set forth in claim 13 above, wherein the configuration space further comprises a configuration header, the configuration header having one or more registers identifying the location of the configuration file, and means for performing the step of accessing the configuration space further comprises:

means for accessing the configuration header;

means for interpreting the configuration header registers to determine the location of the configuration file; and means for accessing the configuration file.

17. The invention as set forth in claim 13 above, wherein the configuration file is divided into a plurality of blocks corresponding to a plurality of languages, and each of the blocks comprises user selectable settings for the user-selectable operating parameters of the peripheral as described in the corresponding language, and the means for performing the presenting step (iv) comprises means for prompting the user for a language selection, means for accepting a language selection from the user, and means for presenting the user-selectable operating parameters of the peripheral to the user from the block corresponding to the language selection.

18. The invention set forth in claim 17 above, wherein the means for performing the presenting step (iv) further comprises a means for selecting a default language selection and presenting the user-selectable settings for the user-selectable operating parameters of the peripheral to the user from the block corresponding to the default language selection.

\* \* \* \* \*